United States Patent Office 3,647,912
Patented Mar. 7, 1972

3,647,912
PREPARATION OF LINEAR OLEFIN PRODUCTS
Arthur W. Langer, Jr., Watchung, Plainfield, N.J., assignor to Esso Research and Engineering Company
No Drawing. Continuation-in-part of application Ser. No. 581,433, Sept. 23, 1966, which is a continuation-in-part of application Ser. No. 562,088, July 1, 1966. This application Mar. 4, 1969, Ser. No. 805,116
The portion of the term of the patent subsequent to Apr. 29, 1986, has been disclaimed
Int. Cl. C07c 3/10
U.S. Cl. 260—683.15 D  10 Claims

ABSTRACT OF THE DISCLOSURE

A linear alpha olefin product comprising at least 90 mole percent linear alpha olefins is prepared by polymerizing ethylene in the presence of a catalyst containing the reaction product of a transition metal halide and an aluminum alkyl, the reaction being effected in a diluent at ethylene pressures in excess of about 50 p.s.i.a. and with a mole ratio of ethylene to product olefin of at least about 0.8.

CROSS REFERENCE

This application is a continuation-in-part of copending application Ser. No. 581,433, filed Sept. 23, 1966, which in turn is a continuation-in-part of copending application Ser. No. 562,088, filed July 1, 1966, both now abandoned.

FIELD OF INVENTION

This invention relates to a novel method of preparing linear olefins. In particular, this invention relates to a novel process for polymerizing ethylene to obtain linear alpha olefin products having a number average molecular weight of from about 70 to about 700, preferably 100–500. More particularly, this invention relates to a novel process for polymerizing ethylene to obtain a product comprising at least 90 mole percent linear olefins in the molecular weight range of from 56 to about 2250, and higher, e.g., up to about 5000.

PRIOR ART

It has been shown in the prior art (U.S. Pat. No. 2,993,942) that hydrocarbon lubricating oils having a molecular weight in the range of 80–2000 could be prepared by polymerizing ethylene with controlled catalyst, diluents and under controlled temperatures. The catalyst consisted of a transition metal halide and a halogenated aluminum alkyl compound. It has also been found that increased oil yields, catalyst reactivity and improved molecular weight control could be obtained by the addition of a minor amount of a lower alkanol, as a catalyst modifier to the reaction system. Both the modified and unmodified systems described above resulted, under the conditions in the reaction, in the production of major portions of other than linear alpha olefin products, particularly Type II (RCH=HCR),

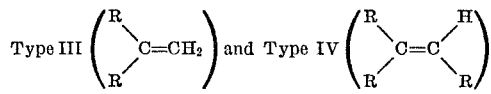

olefins.

It is also known that ethylene can be polymerized under controlled conditions to produce a reaction product containing at least 90 mole percent linear olefin products having an average molecular weight of up to about 300 (abandoned application Ser. No. 428,836, filed Jan. 28, 1965). This process requires the control of certain critical reaction variables comprising the ratio of ethylene to product, the use of a particular catalyst, and pressure ranges.

SUMMARY OF THE INVENTION

It has now been discovered that ethylene can be polymerized to produce a reaction product containing at least 90 mole percent linear olefin products at temperatures including those above 25° C. if a particular catalyst is utilized. The catalyst of this invention is a predominantly soluble complex reaction product obtained by partially reacting a reducible heavy transition metal halide of selected Groups IV–B to VI–B or VIII with an aluminum alkyl compound such that the ultimate formula of the aluminum alkyl compound is $AlR_nX_{3-n}$ wherein $n$ is less than 1, R is alkyl, cycloalkyl or aralkyl, preferably containing 1 to 20 carbon atoms, for example, methyl, ethyl, isobutyl, cyclohexyl, benzyl, etc., and X is chloride, bromide or iodide. While most transition metal halides are suitable components of the catalyst complex when the desired product is the branched chain olefins of the prior art, it has been found that compounds such as $VCl_4$ and $FeCl_3$ are unsuitable for the preparation of linear alpha olefins. The preferred transition metal catalyst component is a titanium compound having a valency of 3 or 4, preferably 4, and may be represented by the formula: $TiX_aA_b$ wherein $a=3$ or 4, $b=0$ or 1 and $a+b=3$ or 4, X=Cl or Br and A is Cl or Br or an anion derived from a protonic compound such as an alcohol (R'OH) or a carboxylic acid (R'COOH). The R' of the protonic compound may be an alkyl, aryl, aralkyl or cycloalkyl group. The $TiX_aA_b$ component may be made in situ by reacting $TiX_4$ with the protonic compound. Thus, the preferred transition metal component of this invention may be selected from the group $TiX_4$, $TiX_3OR'$ and $TiX_3OOCR'$. Typical examples of such compounds are $TiCl_4$, $TiBr_4$, $TiX_3OC_2H_5$ and

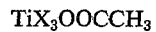

Catalyst concentration is normally in the range of 0.1 to 10 grams per liter of diluent.

As set forth above, it is essential that the aluminum alkyl catalyst after reaction with the transition metal halide have the formula: $AlR_nX_{3-n}$ wherein $n$ is less than 1. The aluminum alkyl compound is employed in a molar ratio to the transition metal of from about 0.1/1 to over 100/1. The Al/Ti ratio is not critical to the reaction. In a preferable embodiment, the catalyst is produced by reacting an aluminum monoalkyl dihalide with the transition metal halide. In less preferred embodiments, minor proportions of an aluminum dialkyl halide can be present in the reaction mixture, provided, however, that the aluminum dialkyl halide is not present in the catalyst resulting from such reaction mixture. Aluminum trialkyls cannot be tolerated in the catalyst even in trace amounts.

Ethylene is unique in the instant invention in that other olefins do not respond to give linear alpha olefins. Therefore, it is desirable to use essentially pure ethylene or mixtures of ethylene with inert gases as the feed for the process of this invention. Ethylene feeds containing minor amounts of other olefins may be used provided that the extent of copolymerization does not decrease product linearity below 90%.

Alcohols may be used to modify the catalysts to control product molecular weight, permit operation at higher temperatures and/or lower pressures with improved selectivity, etc. However, alcohols are not essential for this process if the catalyst composition and polymerization conditions are controlled within a critical range.

The alkanols which can be utilized are those in the $C_1$ to $C_8$ range, preferably $C_1$ to $C_4$. The improvement from the use of the alkanol increases with molecular weight within the stated range. It has also been found that the structure of the alkanol is important. For the butanol series, the yield increased markedly upon changing from primary to secondary to tertiary alcohol. Also, the selectivity to polymer oil (lower average molecuular weight) was considerably higher for secondary butanol and tertiary butanol than for isobutanol. Thus, the alkanols that can be used include methanol, ethanol, n-propanol, isopropanol, n-butanol, sec-butanol, tertiary butanol, isobutanol and all of the $C_5$ and $C_6$ alcohols. $C_3$ to $C_6$ diols in which the hydroxy groups are not attached to adjacent carbon atoms are also useful. Epecially preferred and desirable are: tertiary butanol, secondary butanol, iso- or n-butanol, and isopropanol. These alkanols are utilized in a minor amount, i.e., so that the ratio of ROH/R (based on aluminum alkyl) after reduction of the transition metal is not greater than 0.5 (preferably 0.2 to 0.33). The alkanol can be added either to the transition metal halide or the aluminum alkyl halide prior to the addition of the other component. It is preferred to add it, however, to the aluminum alkyl halide.

Although Lewis bases, such as ethers or tertiary amines, are known to be effective additives for making solid polymers at higher rates with Ziegler-type catalysts, their use with the present catalysts leads to drastic loss of activity and selectivity to liquid linear olefins. Thus, the mode of action of this catalyst under the conditions of this invention appears to be quite different from the conventional catalysts.

It has also been found that any diluent can be used including nonpolar diluents without producing high molecular weight polyethylene polymers or highly branched products. The diluents which can be used in the practice of this invention include: polar solvents such as aromatic hydrocarbons and halogenated aromatic and aliphatic hydrocarbons, and nonpolar solvents such as paraffinic, isoparaffinic and naphthenic hydrocarbons and their halogenated analogs and mixtures thereof. The following are nonlimiting examples of compounds which can be used as diluents in this invention: chlorobenzene, dichlorobenzene, chlorotoluene, benzene, toluene, xylene, tetrahydronaphthalene, methyl chloride, ethylchloride, dichloromethane, heptane, octane, hexane, cyclohexane, methyl cyclohexane, and mixtures thereof.

A critical variable with respect to the selective synthesis of linear alpha olefins is the ethylene pressure. The prior art obtained highly branched olefins (60%) when using the closely related catalyst and diluent systems at pressures of 7 to 30 p.s.i.g. It has now been found that ethylene pressures above 50 p.s.i.a. are essential for making linear olefins in high selectivities. Although some variations are permitted depending upon the catalyst composition, diluent and temperature, the preferred pressures are above about 80 to 100 p.s.i.a. in order to produce commercially attractive yields (at least above 5 weight percent and preferably above 10 weight percent olefins in the reactor effluent) of linear alpha olefins having a purity greater than about 90%. The most preferred range is above 100 p.s.i.a. ethylene pressuure. At very high ethylene pressures, the process may become uneconomical because of the equipment requirements and ethylene recycle, however, selectivity increases tend to offset the cost of equipment and recycle.

The most critical variable found with respect to the selective synthesis of linear olefins is the ethylene concentration. It has been found that the ratio of moles of ethylene to the moles of products must be above 0.8, preferably above about 2, in order to effect the selective synthesis of ethylene to linear olefins. The maintenance of a high ethylene pressure permits this critical ratio to be maintained throughout the reaction. The upper limit of the mole ratio of ethylene to product is not critical. The mole ratio of ethylene to product must be above 0.8 or the produuct formed contains more than 10% branched chain olefins at product concentrations required to obtain commercially attractive yields.

Reaction times are not particularly critical when operating under the preferred conditions and they will normally be in the range of 0.1 to 5 hours to obtain product concentrations greater than 5% by weight in the diluent. The process may be carried out in batch or continuous operation. However, high product purity and high concentration are achieved most easily in batch reactions or in continuous systems operating under essentially plug flow conditions. A reactor may consist of a long pipe through which the diluent and catalyst flow with ethylene being introduced at many points along the pipe to maintain the desired ethylene concentration. In such a system, monomer concentration need not be constant but may be controlled differently in different sections of the reactor to achieve the best balance of activity, molecular weight and product purity. Stirred tank reactors may be operated in series to approach plug flow.

The reaction of the instant process can be terminated by adding a caustic such as alkali metal and alkaline earth metal hydroxides and carbonates, ammonium hydroxide and quaternary ammonium bases and Lewis bases such as ammonia, amines, cyclic nitrogen bases, ethers, etc., to the reaction mixture. These caustics may be used alone or mixed with or dissolved in solvents such as water, alcohols or glycols.

The catalyst of this invention enables the process for making linear olefins to be carried out at temperatures below about $+75°$ C., preferably $-30°$ C. to $+50°$ C. The selection of a particular temperature within the above range will permit control of the number average molecular weight of the product. Alternatively, catalyst composition may be varied to control molecular weight.

The invention will be further understood by reference to the following examples.

EXAMPLE 1

A solution of 0.001 mole $TiCl_4$ in 125 ml. dry xylene was added to a 1 liter stirred autoclave under dry nitrogen and cooled to 15° C. A solution of 0.0005 mole $AlEt_2Cl$ and 0.001 mole $AlEtCl_2$ in 125 ml. xylene was added to the reactor and the catalyst mixture allowed to react 30 minutes at 15° C. After cooling to 0° C., high purity ethylene was charged rapidly to the reactor to reach 525 p.s.i.a. ethylene pressure, after which it was added as necessary to maintain 525 p.s.i.a. Reactor temperature was maintained at 0° C.

After 1 hour the reactor contents were pressured into methanol containing NaOH to kill the catalyst, the solution was water-washed twice and dried over $K_2CO_3$. A sample of the total reactor product was analyzed by quantitative gas chromatography using a 4-foot column of silicone gum rubber. Product linearity is expressed as mole percent in the $C_{12-20}$ fraction. It was measured on the $C_{12-20}$ fraction because this is the most accurate analysis considering volatility losses from $C_{4-10}$ and poorer G.C. resolution of the branched and linear olefins above $C_{20}$. The linearity of the total product is higher than that shown for the $C_{12-20}$ fraction because the $C_{4-10}$ fraction is essentially 100% linear, and it is a major portion of the total product.

Product concentration in the xylene was 9.6 weight percent and the yield was 23 grams of liquid products, excluding appreciable losses of $C_{4-8}$ from volatility during product work-up. No solid high molecular weight polymer was obtained. Linearity was over 99 mole percent in the $C_{12-20}$ fraction, and the alpha olefin content was essentially the same. Number average molecular weight ($\overline{M}_n$) was 123.

Alkylation of $TiCl_4$ takes place according to the equation:

$$R_2AlCl + TiCl_4 \rightarrow RAlCl_2 + RTiCl_3$$

Assuming complete reaction for the catalyst used in this example, one obtains the following:

$$1.5AlEt_{1.33}Cl_{1.67} + TiCl_4 \rightarrow 1.5AlEt_{0.67}Cl_{2.33} + RTiCl_3$$

Thus, the alkyl aluminum halide component had an alkyl/Al ratio of 0.67 if complete reaction occurred.

EXAMPLE 2

A solution 0.016 mole $AlEtCl_2$ and 0.0005 mole $TiCl_4$ in 235 ml. chlorobenzene was pretreated in the autoclave for 30 minutes at 15° C., cooled to 5° C. and 500 p.s.i.a. ethylene was charged. During 45 minutes the temperature was increased to +25° C. and the pressure to 750 p.s.i.a., then these conditions were maintained for an additional 15 minutes. Approximately 10 to 20 ml. samples were taken from the reactor every 15 minutes for G.C. analysis. Each sample was terminated with methanol plus NaOH, the solution was water-washed to remove alcohol, NaOH and catalyst residues, then dried over $K_2CO_3$. Analyses were carried out as in Example 1 except that gas chromatography was done using a 6-foot column packed with 5% silicone gum rubber on Chromosorb G.

Results are summarized in Table I. High purity alpha olefins were obtained in good yield while making only 4 grams of 8300 viscosity average molecular weight alpha olefin wax. The aluminum alkyl halide component had an alkyl/Al ratio of 0.97 calculated as in Example 1 assuming complete reaction. If reaction was incomplete, the ratio was greater than 0.97 but less than 1.0.

TABLE I

| | | | | |
|---|---|---|---|---|
| Polymerization time, minutes | 15 | 30 | 45 | 60 |
| Polymerization temperature, °C | 5 | 15 | 25 | 25 |
| Product concentration, weight percent in $C_6H_5Cl$ [a] | 7.8 | 10.8 | 16.1 | 20.7 |
| Yield, grams [a] | 22 | 31 | 50 | 68 |
| Linear olefins in $C_{12-20}$, mole percent | 99+ | 99+ | 99+ | 99+ |
| $\overline{M}_n$ | 106 | 109 | 118 | 120 |

[a] Excludes 10–20% losses of volatiles and wax which are not recovered in the G.C. analysis.

EXAMPLE 3

An experiment similar to Example 2 was run except that only 109 ml. chlorobenzene was used and polymerization was carried out at +35° C. and 800 p.s.i.a. ethylene pressure for 2 hours. The final product concentration, excluding 10–20% losses, was 62.3 weight percent in the xylene and the yield was 198 grams. Analysis as in Example 2 gave 98.7 mole percent linearity in the $C_{12-20}$ fraction and a number average molecular weight ($\overline{M}_n$) of 138.

EXAMPLE 4

A series of runs were made to determine the utility of catalyst compositions having alkyl/Al ratios below 0.9. In one experiment $AlCl_3$ was added to the $AlEtCl_2$ in order to start with less than 1 R/Al prior to reaction with $TiCl_4$. Procedures were similar to those of Example 3 except as noted in Table II.

TABLE II

| | Run | | | |
|---|---|---|---|---|
| | 1 | 2 | 3 | 4 |
| $AlEtCl_2$, mmoles | 5 | 2 | 5 | 0.5 |
| $AlCl_3$, mmoles | 0 | 0 | 0.2 | 0 |
| $TiCl_4$, mmoles | 1 | 1 | 0.05 | 1 |
| Solvent ml | (1) | (1) | (2) | (2) |
| Pretreat, °C./minutes | 25/60 | 50/30 | 50/30 | 50/30 |
| Al/Ti mole ratio | 5 | 2 | 104 | 0.5 |
| Et/Al ratio [a] | 0.8 | 0.5 | 0.95 | 0 |
| Polymerization: | | | | |
| Temperature, °C | 15 | 50 | 50 | 50 |
| $C_2H_4$, p.s.i.a. | 400 | 400 | 200 | 400 |
| Time, hours | 1 | 1 | 3 | 0.5 |
| Results: | | | | |
| Yield, grams [b] | 132 | 92 | 23 | 51 |
| Linearity, mole percent [c] | 91.5 | 91.2 | 95.2 | 94.3 |
| $\overline{M}_n$ | 113 | 128 | 114 | 116 |

1 Xylene, 125.
2 $C_6H_5Cl$, 250.
[a] Assuming mono-alkylation of $TiCl_4$.
[b] Excluding 10–20% losses during work-up.
[c] Determined on $C_{12-20}$ fraction.

EXAMPLE 5

A solution of 0.5 mmole $TiCl_4$ in 75 ml. pure dry n-heptane was charged to a 1 liter stirred autoclave under dry nitrogen at room temperature and warmed to 50° C. A solution of 0.5 mmole $AlEtCl_2$ in 50 ml. n-heptane was added, the nitrogen atmosphere was evacuated, and the catalyst mixture allowed to react 30 minutes at 50° C. After cooling to 0° C., high purity ethylene was charged rapidly to the reactor to reach 800 p.s.i.a. while the temperature was increased to 40° C. during 5 minutes. Reaction conditions were maintained at 40° C. and 800 p.s.i.a. for 2.5 hours.

The reaction was terminated by pressuring into the reactor 5 mmole NaOH in 100 ml. methanol. After venting the ethylene, a small sample of the reactor product was water-washed twice and dried over $K_2CO_3$ for quantitative gas chromatographic analysis. The remainder of the reactor product was added to about 2 volumes of isopropyl alcohol to precipitate waxy olefins. Filtration and vacuum drying yielded 8.6 grams wax.

G.C. analysis showed that the concentration of cold heptane soluble product was >20 weight percent in the mixture and the yield was >22 grams. Product purity was over 99 mole percent linear alpha olefins based on the $C_{12-20}$ fraction as described in Example 2. The number average molecular weight, calculated for a simple exponential distribution based on the G.C. analysis, was 168.

EXAMPLE 6

The procedure of Example 5 was followed except that reaction temperature was reduced to 20° C. The yield of wax was only 2.4 grams and the total product had a lower $\overline{M}_n$ than that obtained in Example 5 at 40° C. therefore, just as we found in our previous alpha olefin processes in polar solvents, the molecular weight decreased with decreasing reaction temperature. This is directly opposite to that observed with Ziegler catalysts.

EXAMPLE 7

The procedure of Example 5 was followed except that the catalyst was 2 mmole $AlEtCl_2$ and 1 mmole $TiCl_4$, the reaction temperature was 0° C. and the ethylene pressure was 600 p.s.i.a. After 4 hours reaction time, the reactor effluent contained 71 grams of linear alpha olefins in solution. Product purity was over 99 mole percent and $\overline{M}_n$ was 142.

EXAMPLE 8

The procedure of Example 6 was followed except that cyclohexane solvent was used instead of n-heptane. After 2 hours reaction time, the product concentration was 11.4 weight percent, the alpha olefin product was 95 mole percent and $\overline{M}_n$ was 183.

EXAMPLE 9

The procedure of Example 6 was followed except that 3-methylhexane was used instead of n-heptane solvent. After 2 hours reaction time, product concentration was 13.7 weight percent, the linear alpha olefin product purity was 99+ mole percent and $\overline{M}_n$ was 161.

EXAMPLE 10

The procedure of Example 1 was followed except that after 3 hours polymerization time the catalyst was quenched by contacting the reactor contents with 8 ml. 1 M aqueous NaOH for 30 minutes at $-5°$ C. to $+13°$ C., excess ethylene was flashed off, an dthe catalyst residues were extracted by water-washing the hydrocarbon layer. Product concentration in the xylene was 25.9 weight percent and $\overline{M}_n$ was 118. The linear alpha olefin purity was 99+ mole percent in the $C_{12-20}$ fraction as determined in Example 2.

EXAMPLE 11

The process may also be used to prepare high quality synthetic waxes. Optimum yields of waxes are obtained from runs in which the average molecular weight of the total product is between about 100 and 700, preferably 200 to 500. Practical limitations may restrict the preferred molecular weight to a maximum of about 500. Of course, the solid fraction from total products with $\overline{M}_n$ between 100 and 200 may also be isolated for use as a wax, but the properties will be somewhat inferior to those from higher molecular weight total products. The waxes may be obtained in high purity by using one or more of the conventional techniques, such as distillation, extraction, crystallization, etc. The wax concentrates isolated in this manner have narrow molecular weight distributions and may have number average molecular weights in the range 300 to 2500 depending upon the total product $\overline{M}_n$ and the extent of light ends rejection.

A solution of 0.5 mmole $TiCl_4$ in 200 ml. n-heptane was charged to a one l. stirred autoclave and 500 p.s.i.a. ethylene was added at 25° C. A soltuion of 4 mmole $AlEtCl_2$ in 50 ml. n-heptane was pressured into the reactor using ethylene pressure and the conditions were raised to 50° C. and 800 p.s.i.a. during 5 minutes and maintained for 4 hours. The reaction was terminated and the solid product was isolated as in Example 5. The linear alpha olefin product purity was 99 mole percent and $\overline{M}_n$ was 228. The heptane soluble wax fraction was crystallized from isopropyl alcohol at 40° C., yielding 26 g. high quality wax. The wax $\overline{M}_n = 823$ and Fisher Johns M.P. = 160-177° F.

EXAMPLE 12

An experiment similar to Example 2 was run except that only 109 ml. chlorobenzene was used and polymerization was carried out at $+35°$ C. and 800 p.s.i.a. ethylene pressure for 2 hours. The final product concentration, excluding 10-20% losses, was 62.3 weight percent in the xylene and the yield was 198 grams. Analysis as in Example 2 gave 98.7 mole percent linearity in the $C_{12-20}$ fraction and a number average molecular weight $(\overline{M}_n)$ of 138.

The solid product was precipitated with 1 l. methanol and filtered. The wet filter cake was extracted with boiling isopropyl alcohol and then with boiling n-heptane to separate the wax from a small amount of insoluble product. After vacuum stripping the filtrate and drying the solid product, 82 g. alpha olefin wax was obtained having a number average molecular weight of 385. Higher molecular weight, higher melting waxes could be obtained by conventional distillation, crystallization or extraction techniques. A portion of the wax was mixed with 5 volumes isopropyl alcohol, heated to 50° C. to dissolve light ends, allowed to cool slowly to 30° C. to crystallize intermediate molecular weight wax and filtered. The crystalline fraction (33.5%) was washed with acetone and vacuum dried. Based on G.C. analysis of the soluble fraction, the crystalline wax fraction consisted of the olefins having more than about 30 carbons. It had a Fisher-Johns melting point of 145-154° F.

These examples illustrate that effective catalysts were obtained using alkyl/Al ratios from 0 to 0.95 and Al/Ti ratios from 0.5/1 and 104/1 and that various diluents can be employed. Catalyst activities, product purities (greater than 90% linear alpha olefins) and product molecular weights $(\overline{M}_n)$ were all within the preferred ranges. The ethylene/product olefin ratios were greater than about 2.

What is claimed is:

1. A process for selectively preparing linear olefins having a number average molecular weight ranging from about 70 to 700, said process comprising the step of polymerizing an ethylene-containing gas in the presence of a substantially soluble catalyst formed by mixing components comprising a titanium compound, said compound being one selected from the group consisting of $TiX_4$, $TiX_3OR'$, $TiX_3OOCR'$, wherein X is one selected from the group consisting of chlorine and bromine, and R' is one selected from the group consisting of alkyl, aralkyl and cycloalkyl and an aluminum alkyl compound such that the ultimate formula of the aluminum alkyl compound is $AlR_nX'_{3-n}$ wherein R is selected from the group consisting of alkyl, aralkyl and cycloalkyl, X' is selected from the group consisting of chlorine, bromine and iodine and $n$ is less than 1, in the presence of a diluent at a temperature less than about 75° C. and an ethylene pressure above about 100 p.s.i.a. wherein the mole ratio of ethylene to the reaction product is above 0.8 throughout the reaction, and recovering a reaction product comprising at least about 90 mole percent linear olefins in which the product olefin concentration is greater than about 5 weight percent based on said diluent contained in the reaction product.

2. The process of claim 1 wherein said titanium compound is $TiCl_4$.

3. The process of claim 1 wherein said ratio of ethylene to the reaction product is above about 2.

4. The process of claim 1 wherein the diluent is a polar hydrocarbon.

5. The process of claim 4 wherein the polar hydrocarbon is selected from the group consisting of aromatic hydrocarbons and halogenated aromatic hydrocarbons.

6. The process of claim 1 wherein the diluent is a saturated hydrocarbon.

7. The process of claim 1 wherein the aluminum alkyl compound is aluminum ethyldichloride.

8. The process of claim 1 wherein the ethylene pressure is above about 500 p.s.i.a.

9. The process of claim 1 wherein the temperature ranges from about $-30°$ C. to $+50°$ C.

10. The process of claim 1 wherein a wax concentrate having a number average molecular weight of about 300 to 2500 is recovered from the product olefin.

References Cited

UNITED STATES PATENTS

| 3,108,145 | 10/1963 | Antonsen | 260—683.15 |
| 3,168,588 | 2/1965 | White et al. | 260—683.15 |
| 3,441,630 | 4/1969 | Langer et al. | 260—683.15 |

FOREIGN PATENTS

| 874,577 | 8/1961 | Great Britain | 260—683.15 |

PAUL M. COUGHLAN, JR., Primary Examiner

U.S. Cl. X.R.

260—94.9 B